United States Patent Office 3,098,864
Patented July 23, 1963

3,098,864
ARYLFERROCENES AND A PROCESS FOR PREPARING THEM
Marvin D. Rausch, Dayton, Ohio, assignor to Monsanto Chemical Company, St. Louis, Mo., a corporation of Delaware
No Drawing. Filed Apr. 19, 1961, Ser. No. 104,008
7 Claims. (Cl. 260—439)

This invention is related to organometallic compounds. More particularly this invention is directed to arylferrocene compounds and a process for preparing them.

An object of this invention is to provide some new arylferrocenes. Another object of this invention is to provide an improved method for preparing arylferrocene compounds in general.

In general this invention provides some new arylferrocene compounds and an improved process for making arylferrocene compounds. The new compounds provided by this invention are 2-biphenylylferrocene, 3-biphenylylferrocene, and 4-biphenylylferrocene. According to the method of this invention arylferrocene compounds are prepared by reacting diferrocenylmercury with a diarylmercury compound in the presence of a silver-containing catalyst. The method is preferably conducted in the liquid phase and the silver-containing catalyst may be derived from any medium which will produce elemental silver metal for use in catalyzing the reaction. More specifically, the process of this invention involves the preparation of arylferrocene compounds by heating a mixture of diferrocenylmercury and a diarylmercury compound in the presence of metallic silver at a temperature of from about 230° C. to 350° C., in the presence or absence of air, until a substantial quantity of the arylferrocene product is obtained. The arylferrocene product can be readily recovered from the reaction mixture by known methods, for example, by solvent extraction and by chromatographic techniques.

The diferrocenylmercury starting material useful for the purposes of this invention may be prepared by reacting ferrocene with mercuric acetate at room temperature in an ethyl ether-methanol or methanol-benzene solvent to get ferrocenylmercuric chloride which is treated with aqueous sodium thiosulfate to obtain the desired diferrocenylmercury.

The diarylmercury compounds used as reactants in the method of this invention are those preferably having from 6 to 18 carbon atoms in each aryl group. They may be readily prepared by reacting the appropriate arylhalide with metallic lithium to obtain the lithium salt of the aryl compound and in treating this resultant lithium aryl compound with mercuric chloride to obtain the arylmercuric chloride compound. This compound is then converted by a variety of known methods, viz., sodium thiosulfate solution, to the corresponding diarylmercury compound. Examples of said compounds which may be used are diphenylmercury, dinaphthylmercury, for example di-(2-naphthyl)-mercury, the dibiphenylylmercury compounds, for example, di-(2-biphenylyl)mercury, the dianthracenylmercury compounds, for example di-(9-anthracenyl)mercury, the di-(chrysenyl)mercury compounds, for example di-(5-chrysenyl)mercury compounds, di-(phenanthracenyl)mercury compounds, for example di-(1-phenanthracenyl)mercury and the alkyl substituted derivatives thereof, such as di-(ortho-, meta-, or para-tolyl)mercury, the di-(xylyl)mercury compounds, for example di-(2,4-dimethylphenyl)mercury, the di-(alkyl-substituted dinaphthyl)mercury compounds, for example di-(4-methyl-1-naphthyl)mercury, etc. The diferrocenylmercury and the diarylmercury reactants may be combined in any desired manner. Usually, however, stoichiometric proportions of the two reactants are sufficient to effect rapid economical conversion to the arylferrocene compound of this invention. It is usually desired, however, to have present at least stoichiometric quantities of the diferrocenylmercury reactant, preferably a slight excess thereof, in relation to the diarylmercury reactant to insure an efficient production of the arylferrocene compound.

The silver catalyst may be combined with the diferrocenylmercury compound and the diarylmercury compound in any desired order. It may be added to the diferrocenylmercury compound prior to, simultaneously with, or after the addition of the diarylmercury compound. Likewise, it may be combined with the diarylmercury compound prior to the addition of the diferrocenylmercury compound. It is only necessary that the reactants be contacted at a temperature sufficient to cause liquification of the reaction mixture, but at a temperature low enough to avoid decomposition of the reactants or product. Such a temperature range runs from about 230° C. to about 350° C. Preferably, the reaction is run at from about 250° C. to about 300° C. for a time sufficient to effect formation of the arylferrocene compound. Indications are that within the temperature range under optimum conditions, very short reaction times are needed. When operating within the preferred method of this invention, that is, when the intimate mixture of the reactants are heated to from about 250° C. to about 300° C., reaction is completed within a few minutes. Longer heating times are usually used to insure complete reaction and efficient use of reactants. However, longer reaction times on the order of about ½ to about 20 hours are not unusual under varying conditions of reaction. Factors such as the amount of silver catalyst used, degree of subdivision of the silver catalyst, the physical nature of the reactants, absence or presence of a diluent material, the particular diarylmercury compound being used, etc., will have some influence on the reaction time.

The silver used for the purpose of this invention can be the ordinary metallic silver, and may be in any desired physical form. For this invention, powdered silver is preferred since it is desired in such a case to have as intimate contact between the reactants as possible. This may be done, for example by mixing the silver catalyst with the reactants prior to the heating step. When silver metal having surface coatings of silver oxide thereof are to be used, it is ordinarily preferred for the purpose of this invention, to treat the silver to render it more reactive. Various treatments for this purpose are known. Silver metal for use in this invention may be activated according to the procedure described in G. Brauer, Handbuch der Präparativen Anorganischen Chemie, Ferdinand Enke Verlag, Stuttgart, 1954, p. 766.

The silver catalyst may be present in the reaction mixture in amounts ranging from 0.5% up to stoichiometric proportions of the reactants. A general excess of the silver on the order of up to 2 to 3 times the molar amount of the ferrocenylmercury compound is not unusual where rapid and complete reaction of the diferrocenylmercury is desired. The silver may be contacted with the mixture of the diferrocenylmercury and the diarylmercury reactants in any desired manner for operation in a batch or continuous process.

Heating of the diferrocenylmercury and the diarylmercury reactants in the presence of a silver catalyst results in a chemical reaction to obtain the arylferrocene compound with the release of elemental mercury. The exact chemical mechanism is not completely understood. However, it is known that this reaction does not proceed to any appreciable extent in the absence of the silver catalyst. The arylferrocene product is perhaps best removed from the reaction mixture by solvent extraction and by using chromatographic techniques. These arylferrocene compounds are soluble in such organic liquids as hexane, heptane, benzene, xylene, etc. and are readily taken up therein. The arylferrocene compounds may be then crystallized from the organic solvent used, and re-dissolved and re-crystallized if further purification is desired.

The arylferrocene compounds of this invention obtained according to the method of this invention generally range from yellow to orange-colored crystalline materials having readily determinable melting points. These compounds are particularly stable to heat in the liquid state even in the presence of oxygen to 225° C. to 250° C. When heated in the absence of oxygen, they are not visibly altered at temperatures of up to 350° C. They are useful as anti-oxidants, and as gasoline anti-knock agents. They are useful as pigments for paint compositions. They are useful as anti-oxidants in polymeric compositions.

The invention is more particularly illustrated by the following examples but is not intended to be limited thereby.

*Example 1*

A mixture of 1.24 g. (0.0022 mole) of diferrocenylmercury, 0.77 g. (0.0022 mole) of diphenylmercury and 3.45 g. of silver metal was thoroughly mixed and inserted into a sublimation tube under nitrogen. The tube was heated in a Wood's metal bath at 200 to 300° C. for 21 hours. After the first hour a reduced (water aspirator) pressure was applied in order to facilitate sublimation of the products. After sublimation and recrystallization from heptane, and chromatography on alumina, there was obtained a total yield of 0.51 g. (45% of theory) of phenylferrocene, M.P. 111°–112° C. The infrared spectrum of phenylferrocene prepared by this method was identical to the infrared spectrum of phenylferrocene prepared by Broadhead and Pauson, Journal of Chemical Society, page 367 (1955).

*Example 2*

A mixture of 0.86 g. (0.0015 mole) of diferrocenylmercury, 0.76 g. (0.0015 mole) of di-(4-biphenylyl)-mercury, and 2.38 g. of silver metal was thoroughly mixed and added to a sublimation tube under nitrogen. The tube was heated in a Wood's metal bath maintained at 265 to 275° C. for 17 hours. An orange-white sublimate was noted. This was extracted with benzene, Skellysolve B (a mixture of low boiling saturated hydrocarbons) was added, and the solution cooled. The benzene-Skellysolve B solution was concentrated and chromatographed on alumina. Elution with Skellysolve B-benzene mixtures gave 0.12 g. of 4-biphenylylferrocene, M.P. 163.5 to 164° C. A second recrystallization produced an analytical sample, having a M.P. of 164 to 165° C. Calculated for $C_{22}H_{18}Fe$: C, 78.12%; H, 5.36%; Fe, 16.51%; molecular weight 338. Found: C, 78.07%; H, 5.37%; Fe, 16.60%; molecular weight 330.

*Example 3*

A mixture of 0.86 g. (0.0015 mole) of diferrocenylmercury, 0.76 g. (0.0015 mole) of di-(3-biphenylyl)mercury, and 2.38 g. of silver metal was well-mixed and added to a sublimation tube under nitrogen. The tube was heated in a Wood's metal bath maintained at 265 to 285° C. for 17 hours. The sublimate which formed was collected, dissolved in a little Skellysolve B:benzene 1:1 and chromatographed on alumina as above. The first band was collected and re-chromatographed to give 0.18 g. of orange crystals, M.P. of from 95 to 98° C. Re-crystallization of the product from Skellysolve B produced 0.11 g. of 3-biphenylylferrocene, M.P. 101 to 102° C. Two additional recrystallizations raised the melting point to 102.5 to 103° C. Analysis was calculated for $C_{22}H_{18}Fe$: C, 78.12%; H, 5.36%; Fe, 16.51%; molecular weight 338. Found: C, 76.91%; H, 5.45%; Fe, 17.01%; molecular weight 338. An infrared spectrum of 3-biphenylylferrocene was consistent with the proposed structure.

*Example 4*

A mixture of 0.86 g. (0.015 mole) of diferrocenylmercury, 0.76 g. (0.0015 mole) of di-(2-biphenylyl)mercury and 2.38 g. of silver metal was well-mixed and added to a sublimation tube and heated at 240 to 260° C. for 17 hours. The reaction mixture was extracted with boiling benzene and poured through a column of alumina as in the prior examples. There was obtained as product 0.03 g. of 2-biphenylylferrocene, M.P. 133–134° C. *Analysis.*—Calculated for $C_{22}H_{18}Fe$: C, 18.12%; H, 5.36%; Fe, 16.51%; molecular weight 338. Found: C, 77.86%; H, 5.59%; Fe, 16.65%; molecular weight 324. The infrared spectrum of 2-biphenylylferrocene was consistent with the proposed structure.

I claim:

1. A process for preparing an arylferrocene compound which comprises reacting diferrocenylmercury with a diarylmercury compound which has from 6 to 18 carbon atoms in each aryl group in the presence of a metallic silver-containing catalyst at a temperature of from about 230° C. to 350° C.

2. A process for preparing an arylferrocene compound which comprises heating diferrocenylmercury with a diarylmercury compound having from 6 to 18 carbon atoms in each aryl group in the presence of a metallic silver-containing catalyst at a temperature of from about 230° C. to 350° C.

3. A process for preparing an arylferrocene compound which comprises heating diferrocenylmercury with a diarylmercury compound having from 6 to 18 carbon atoms in each aryl group at a temperature of from about 230° C. to about 350° C., and in the substantial absence of an oxygen-containing gas in the presence of a metallic silver containing catalyst.

4. A process for preparing phenylferrocene which comprises reacting diferrocenylmercury with diphenylmercury in the presence of a metallic silver-containing catalyst at a temperature of from about 230° C. to 350° C.

5. A process for preparing 2-biphenylylferrocene which comprises reacting diferrocenylmercury with di(2-biphenylyl)mercury in the presence of a metallic silver-containing catalyst at a temperature of from about 230° C. to 350° C.

6. A process for preparing 3-biphenylylferrocene which comprises reacting diferrocenylmercury with di(3-biphenylyl)mercury in the presence of a metallic silver-containing catalyst at a temperature of from about 230° C. to 350° C..

7. A process for preparing 4-biphenylylferrocene which comprises reacting diferrocenylmercury with di-(4-biphenylyl) mercury in the presence of a metallic silver-containing catalyst at a temperature of from about 230° C. to 350° C.

References Cited in the file of this patent

Baun: Analytical Chemistry, vol. 31, May-August (1959), pp. 1308–1311.

Rosenblum: Thesis on Ferrocene, deposited for use in Harvard University main Library on February 19, 1954, page 86.